(12) United States Patent
Mizoguchi et al.

(10) Patent No.: US 7,746,857 B2
(45) Date of Patent: Jun. 29, 2010

(54) TRANSMITTING APPARATUS, TRANSMITTING METHOD, PROGRAM, AND COMMUNICATIONS SYSTEM

(75) Inventors: Yasuhiko Mizoguchi, Tokyo (JP); Hideki Iwami, Saitama (JP); Satoshi Futenma, Tokyo (JP); Natsuki Itaya, Chiba (JP)

(73) Assignee: Sony Corporation, Tokyo (JP)

( * ) Notice: Subject to any disclaimer, the term of this patent is extended or adjusted under 35 U.S.C. 154(b) by 411 days.

(21) Appl. No.: 11/933,842

(22) Filed: Nov. 1, 2007

(65) Prior Publication Data

US 2008/0107040 A1 May 8, 2008

(30) Foreign Application Priority Data

Nov. 2, 2006 (JP) ............................. P2006-298605

(51) Int. Cl.
*H04L 12/28* (2006.01)
*H04L 12/56* (2006.01)
*H04L 12/66* (2006.01)
*H04J 3/16* (2006.01)
*H04J 3/00* (2006.01)
*G06F 11/00* (2006.01)

(52) U.S. Cl. ..................... 370/389; 370/463; 370/465; 370/521; 370/395.4; 370/230

(58) Field of Classification Search ................. 370/230, 370/235, 270, 312, 390, 432, 486; 455/2.01
See application file for complete search history.

(56) References Cited

U.S. PATENT DOCUMENTS

| 5,357,510 | A | * | 10/1994 | Norizuki et al. | .......... 370/236.2 |
| 5,499,240 | A | * | 3/1996 | Gittins et al. | ............... 370/468 |
| 5,880,856 | A | | 3/1999 | Ferriere | |
| 6,259,735 | B1 | | 7/2001 | Aono et al. | |
| 6,707,948 | B1 | | 3/2004 | Cosman et al. | |
| 6,813,314 | B2 | | 11/2004 | Aono et al. | |
| 6,847,468 | B2 | | 1/2005 | Ferriere | |
| 7,299,300 | B2 | * | 11/2007 | Desai et al. | ................. 709/247 |
| 7,420,992 | B1 | * | 9/2008 | Fang et al. | ................... 370/477 |
| 2003/0131122 | A1 | | 7/2003 | Kondo et al. | |

(Continued)

FOREIGN PATENT DOCUMENTS

JP 402100433 A * 4/1990

(Continued)

*Primary Examiner*—Chi H Pham
*Assistant Examiner*—Warner Wong
(74) *Attorney, Agent, or Firm*—Finnegan, Henderson, Farabow, Garrett & Dunner, L.L.P.

(57) ABSTRACT

There is provided a transmitting apparatus for transmitting data, which includes: compressing means compressing data to be transmitted; packetizing means packetizing the data compressed by the compressing means; a buffer for accumulating the data which are packetized; transmitting means transmitting the data accumulated in the buffer; clearing means clearing the buffer at each time that a predetermined time is lapsed; number-of-data counting means counting the number of the data which are not transmitted within the predetermined time; time measuring means measuring a transmission idle time which lasts from a transmission completion time to a clearing time, in a case where all of the data accumulated in the buffer are transmitted before the predetermined time is lapsed; and compression controlling means controlling a compression rate of the data, depending on the number of the data counted or the transmission idle time measured.

9 Claims, 10 Drawing Sheets

U.S. PATENT DOCUMENTS

| | | | |
|---|---|---|---|
| 2004/0160967 A1* | 8/2004 | Fujita et al. | 370/401 |
| 2006/0087969 A1* | 4/2006 | Santiago et al. | 370/229 |
| 2007/0195815 A1* | 8/2007 | Turner et al. | 370/465 |
| 2008/0062877 A1* | 3/2008 | Chen | 370/235 |
| 2009/0041042 A1* | 2/2009 | Diab | 370/401 |

FOREIGN PATENT DOCUMENTS

| | | | |
|---|---|---|---|
| JP | 404077150 A * | 3/1992 | |
| JP | 2003-174486 | 6/2003 | |
| JP | 2004-343421 | 12/2004 | |
| JP | 2005-151303 | 6/2005 | |
| JP | 2006-74359 | 3/2006 | |
| JP | 2006-191225 | 7/2006 | |

* cited by examiner

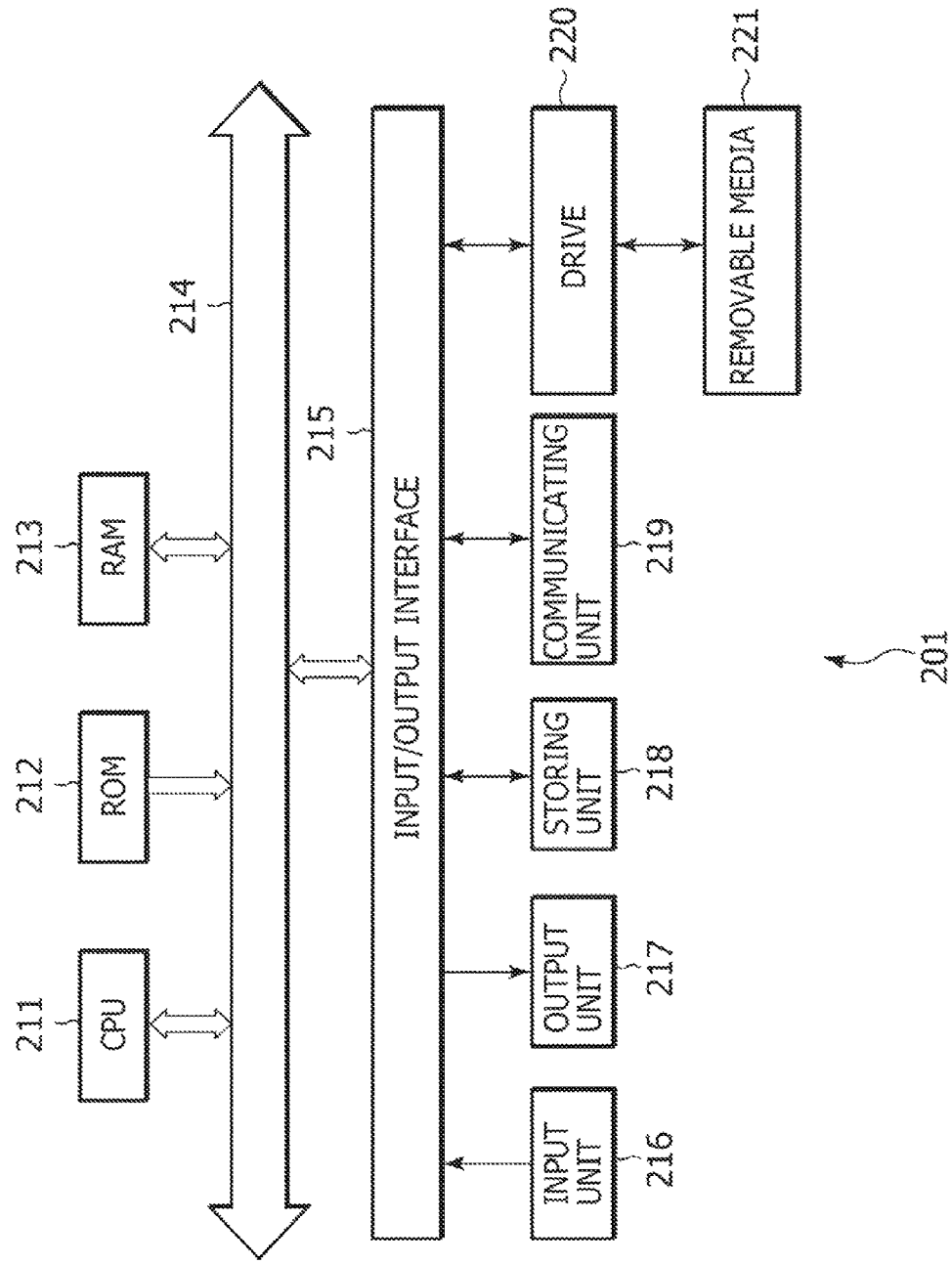

TRANSMITTING APPARATUS, TRANSMITTING METHOD, PROGRAM, AND COMMUNICATIONS SYSTEM

BACKGROUND OF THE INVENTION

1. Field of the Invention

The present invention relates to a transmitting apparatus and a transmitting method, a program, and a communications system. In particular, the present invention relates to a transmitting apparatus and a transmitting method, a program, and a communications system, adapted to perform an optimal communication, in which a delay time emphasized in streaming or the like is stabled and so on, by using only information on a transmission side without depending on communications media.

2. Description of Related Art

In a related art, a quality of a communication path is calculated, based on an error rate of a packet on a receiving side or an S/N ratio of a signal to perform an adjustment for changing a transmission rate (for example, see Japanese Patent Application Publication (KOKAI) No. 2006-74359).

SUMMARY OF THE INVENTION

However, in the related art, there is a need of statistical processing, and an amount of transmission delay varies, and so on. Thus, to perform streaming, there is a need of having many buffers. Further, the error rate and an S/N characteristic differ depending on communications media, and thus, there is a need of optimization in each communications medium.

The present invention has been achieved in view of the circumstances, and there is a need of performing an optimal communication without depending on communications media.

A transmitting apparatus according to a first aspect of the present invention is a transmitting apparatus for transmitting data, and is provided with: a transmitting apparatus for transmitting data, comprising: data import means for importing data; packetizing means for packetizing the data imported by the data import means; a buffer for accumulating the data which are packetized; transmitting means for transmitting the data accumulated in the buffer; clearing means for clearing the buffer at each time that a predetermined time is lapsed; number-of-data counting means for counting the number of the data which are not transmitted within the predetermined time; time measuring means for measuring a transmission idle time which lasts from a transmission completion time of the data to a clearing time of the buffer by the clearing means, in a case where all of the data accumulated in the buffer are transmitted before the predetermined time is lapsed; and data import controlling means for controlling a data importing rate, based on the number of the data counted by the number-of-data counting means or the transmission idle time measured by the time measuring means.

The data import means is capable of compressing data to be transmitted, and the data import controlling means is capable of controlling a compression rate of the data, based on the number of the data counted by the number-of-data counting means or the transmission idle time measured by the time measuring means.

The packetizing means is capable of packetizing the data imported by the data import means with each priority, and the transmitting means is capable of transmitting the data accumulated in the buffer in an order of the priority.

The buffer may be configured with a plurality of buffer areas.

The transmitting apparatus may further include speed controlling means for controlling a transmission speed of the data, depending on the transmission idle time measured by the time measuring means.

A transmitting method according to the first aspect of the present invention is a transmitting method of a transmitting apparatus for transmitting data, and includes the following steps of: importing data to be transmitted; packetizing the data which are imported; accumulating into a buffer the data which are packetized; transmitting the data accumulated in the buffer; clearing the buffer at each time that a predetermined time is lapsed; counting the number of data which are not transmitted within the predetermined time; measuring a transmission idle time which lasts from a transmission completion time of the data to a clearing time of the buffer, in a case where all of the data accumulated in the buffer are transmitted before the predetermined time is lapsed; and controlling a importing rate of the data, depending on the number of the data which are counted or the transmission idle time which is measured.

A program according to the first aspect of the present invention is a program for allowing a computer to perform a process for transmitting data, and includes the following steps of: importing data to be transmitted; packetizing the data which are imported; accumulating into a buffer the data which are packetized; transmitting the data accumulated in the buffer; clearing the buffer at each time that a predetermined time is lapsed; counting the number of data which are not transmitted within the predetermined time; measuring a transmission idle time which lasts from a transmission completion time of the data to a clearing time of the buffer, in a case where all of the data accumulated in the buffer are transmitted before the predetermined time is lapsed; and controlling a importing rate of the data, depending on the number of the data which are counted or the transmission idle time which is measured.

A communications system according to a second aspect of the present invention is a communications system configured by: a transmitting apparatus for transmitting data; and a receiving apparatus for receiving the data, in which the transmitting apparatus is provided with: data import means for importing data; packetizing means for packetizing the data imported by the data import means; a buffer for accumulating the data which are packetized; transmitting means for transmitting to the receiving apparatus the data accumulated in the buffer; clearing means for clearing the buffer at each time that a predetermined time is lapsed; number-of-data counting means for counting the number of the data which are not transmitted within the predetermined time; time measuring means for measuring a transmission idle time which lasts from a transmission completion time of the data to a clearing time of the buffer by the clearing means, in a case where all of the data accumulated in the buffer are transmitted before the predetermined time is lapsed; and data import controlling means for controlling a data importing rate, depending on the number of the data counted by the number-of-data counting means or the transmission idle time measured by the time measuring means.

In the first aspect of the present invention, the data to be transmitted are imported; the data which are imported are packetized; the data which are packetized are accumulated into a buffer; the data accumulated in the buffer are transmitted; and the buffer is cleared at each time that a predetermined time is lapsed. Further, the number of data not transmitted within the predetermine time is counted; in a case where all of the data accumulated in the buffer are transmitted before the predetermined time is lapsed, a transmission idle time which lasts from a transmission completion time of the data to a clearing time of the buffer is measured; and the importing rate of the data is controlled, depending on the number of the data which are counted or the transmission idle time which is measured.

In the second aspect of the present invention, by the transmitting apparatus, the data to be transmitted are imported; the data which are imported are packetized; the data which are packetized are accumulated into a buffer; the data accumulated in the buffer are transmitted to the receiving apparatus; and the buffer is cleared at each time that a predetermined time is lapsed. Further, the number of data not transmitted within the predetermine time is counted; in a case where all of the data accumulated in the buffer are transmitted before the predetermined time is lapsed, a transmission idle time which lasts from a transmission completion time of the data to a clearing time of the buffer is measured; and the importing rate of the data is controlled, depending on the number of the data which are counted or the transmission idle time which is measured.

These and other features and aspects of the invention are set forth in detail below with reference to the accompanying drawings in the following detailed description of the embodiments.

BRIEF DESCRIPTION OF THE DRAWINGS

FIG. 10 is a block diagram showing a configuration example of a personal computer to which the present invention is applied.

DETAILED DESCRIPTION OF THE EMBODIMENTS

Figure 1:
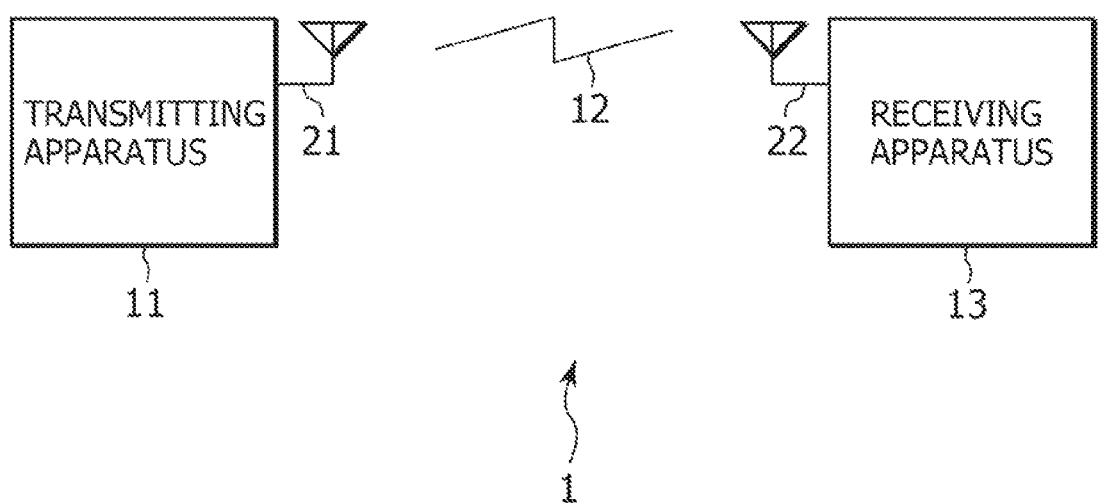
FIG. 1 is a block diagram showing a configuration of one embodiment of a communications system to which the present invention is applied.

Embodiment of the present invention will hereinafter be described. Correspondences between constituent features of the present invention and an embodiment described in a specification or drawings are illustrated as follows. This description is to confirm that an embodiment supporting the invention is described in the specification or drawings. Therefore, even when there is an embodiment described in the specification or the drawings but not described herein as an embodiment corresponding to the constituent features of the present invention, it does not mean that the embodiment does not correspond to the constituent features. Conversely, even when an embodiment is described herein as corresponding to the constituent features, it does not mean that the embodiment does not correspond to the constituent features other than those constituent features.

A transmitting apparatus of a first aspect of the present invention is a transmitting apparatus (a transmitting apparatus 11 in FIG. 1, for example) for transmitting data provided with: data import means (an information compressing unit 31 in FIG. 2, for example) for importing data to be transmitted; packetizing means (an attribute-by-attribute packetizing unit 32 in FIG. 2, for example) for packetizing the data imported by the data import unit; a buffer (a transmission buffer 33 in FIG. 2, for example) for accumulating the data which are packetized; transmitting means (a communications media access controller 34 in FIG. 2, for example) for transmitting the data accumulated in the buffer; clearing means (a buffer clearing unit 38 in FIG. 2, for example) for clearing the buffer at each time that a predetermined time is lapsed; number-of-data counting means (an untransmitted-packet counting unit 39 in FIG. 2, for example) for counting the number of the data not transmitted within the predetermine time; time measuring means (a transmission-idle-time measuring/counting unit 40 in FIG. 2, for example) for measuring a transmission idle time which lasts from a transmission completion time of the data to a clearing time of the buffer by the clearing means, in a case where all the data accumulated in the buffer are transmitted before the predetermined time is elapsed; and data import controlling means (a compression controller 41 in FIG. 2, for example) for controlling a importing rate of the data, depending on the number of the data counted by the number-of-data counting means or the transmission idle time measured by the time measuring means.

Figure 9:
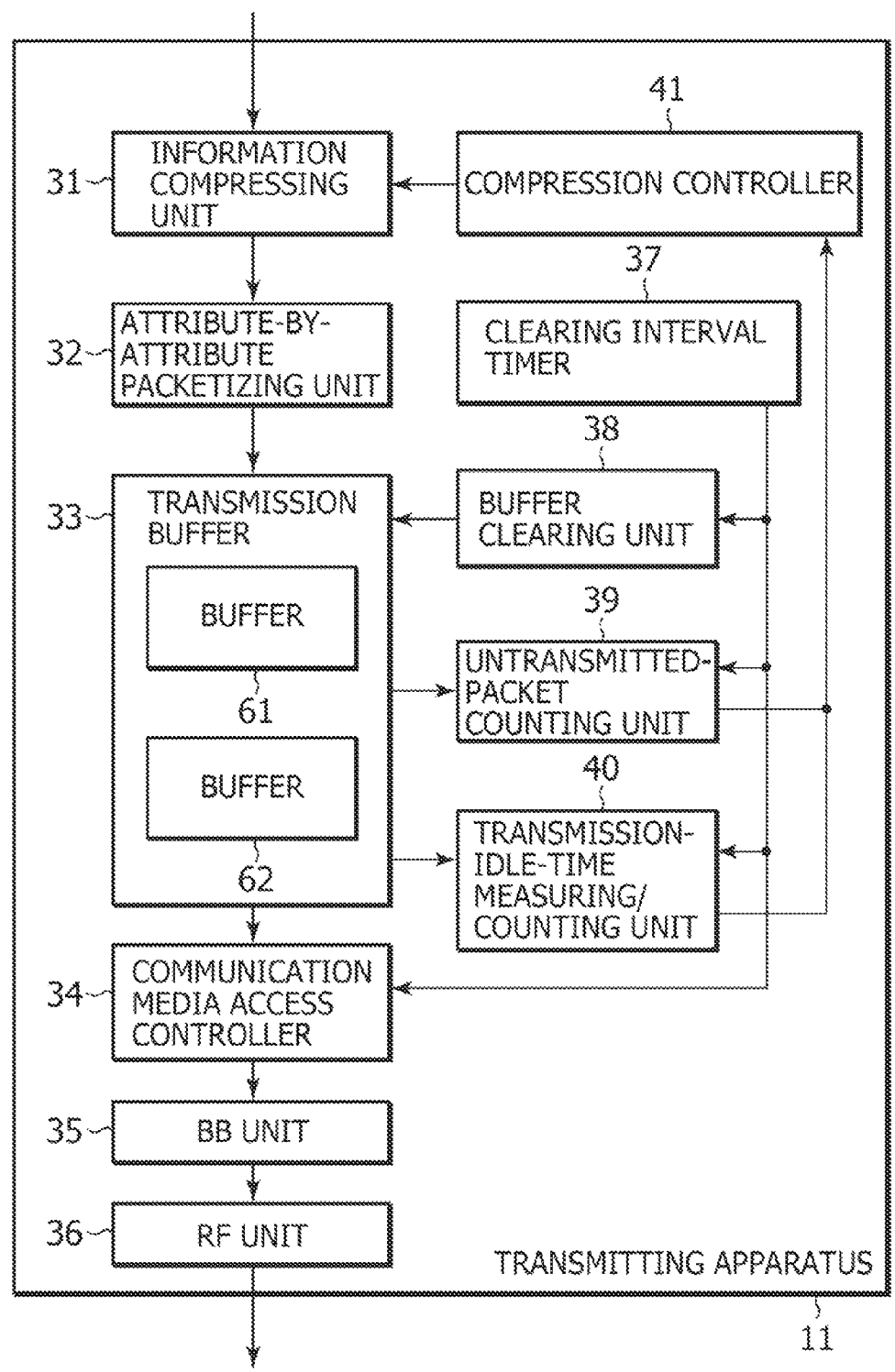
FIG. 9 is a block diagram showing another configuration example of the transmitting apparatus of FIG. 1.

The buffer may be configured with a plurality of buffer areas (a buffer 61 and a buffer 62 in FIG. 9, for example).

The transmitting apparatus may further include speed controlling means (a BB unit 35 in FIG. 2, for example) for controlling a transmission speed of the data, depending on the transmission idle time measured by the time measuring means.

Figure 6:
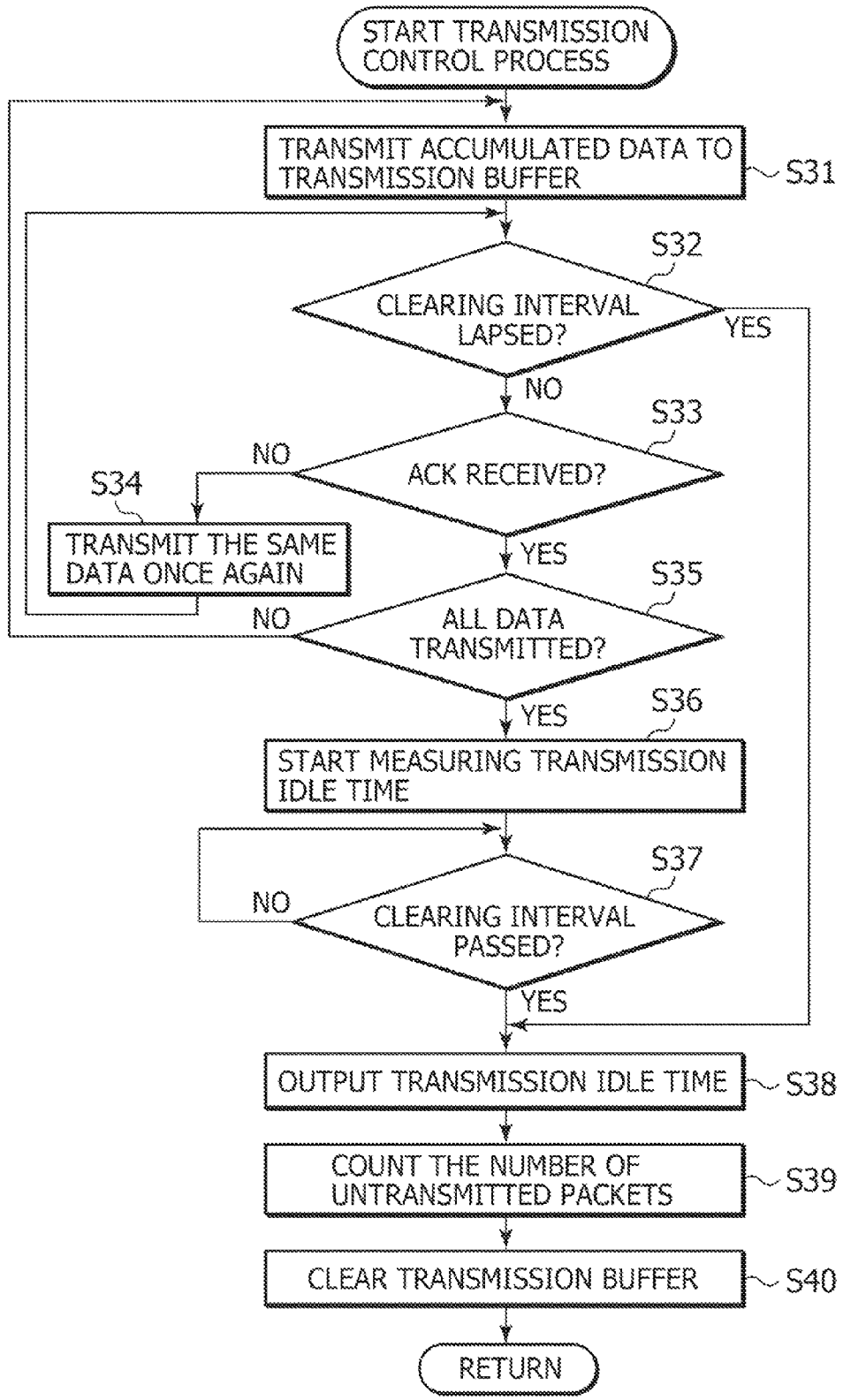
FIG. 6 is a flowchart for explaining a transmission control process of a step S14 of FIG. 5.
Figure 7:
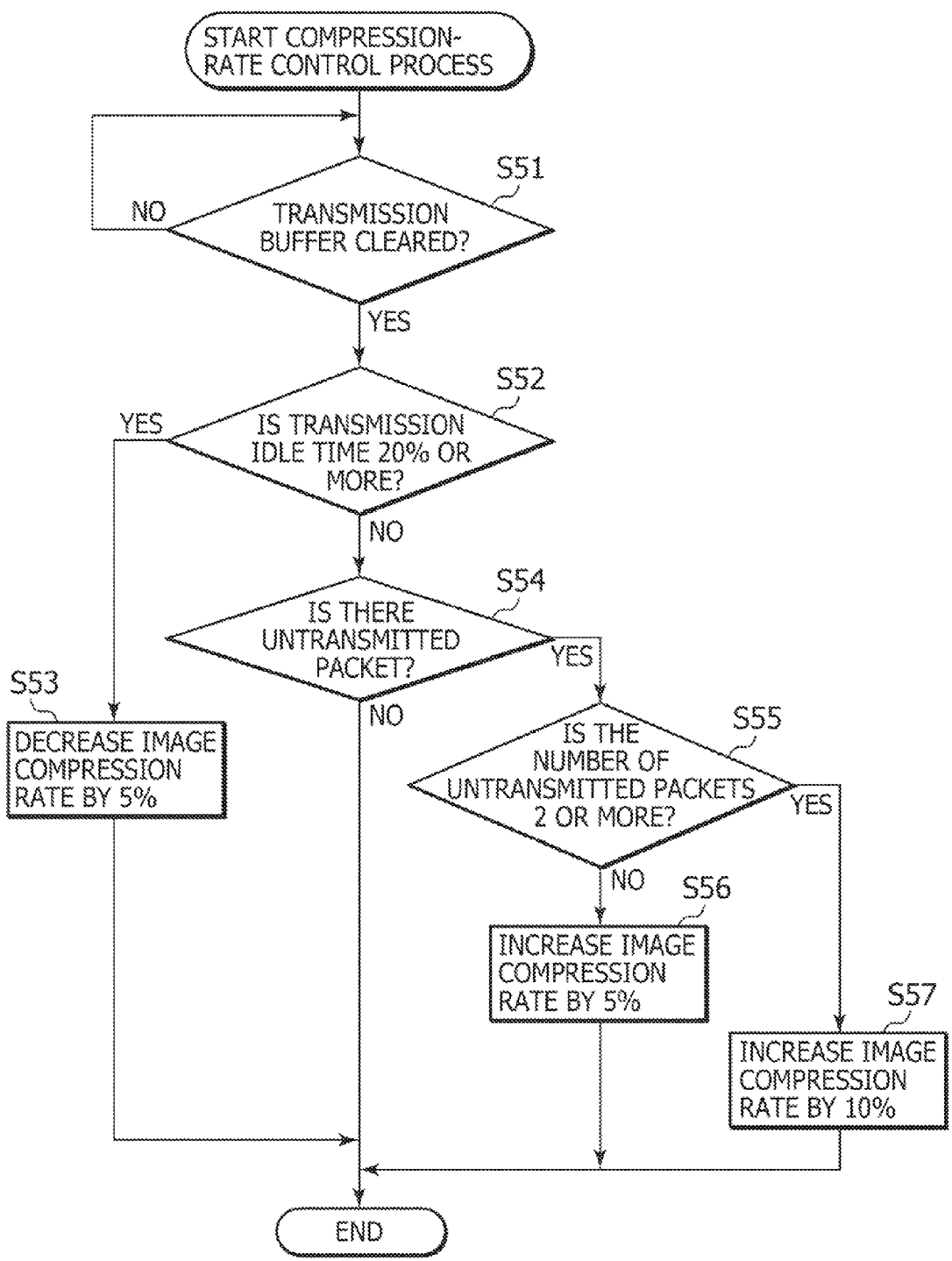
FIG. 7 is a flowchart for explaining an example of a compression-rate control process of the transmitting apparatus of FIG. 1.

A transmitting method or a program of the first aspect of the present invention is a transmitting method or a program for a transmitting apparatus for transmitting data, and is provided with the following steps of: importing data to be transmitted (step S11 in FIG. 5, for example); packetizing the data which are imported (step S12 in FIG. 5, for example); accumulating into a buffer the data which are packetized (step S13 in FIG. 5, for example); transmitting the data accumulated in the buffer (step S31 in FIG. 6, for example); clearing the buffer at each time that a predetermined time is lapsed (step S40 in FIG. 6, for example); counting the number of data not transmitted within the predetermine time (step S39 in FIG. 6, for example); measuring a transmission idle time which lasts from a transmission completion time of the data to a clearing time of the buffer, in a case where all the data accumulated in the buffer are transmitted before the predetermined time is lapsed (step S36 in FIG. 6, for example); and controlling a importing rate of the data, depending on the number of the data which are counted or the transmission idle time which is measured (step S53 in FIG. 7, for example).

A communications system of a second aspect of the present invention is a communications system (a communications system 1 in FIG. 1, for example) formed of a transmitting apparatus (a transmitting apparatus 11 in FIG. 1, for example) for transmitting data, and a receiving apparatus (a receiving apparatus 13 in FIG. 1, for example) for receiving the data, in which the transmitting apparatus includes data import means (an information compressing unit 31 in FIG. 2, for example) for importing data to be transmitted; packetizing means (an attribute-by-attribute packetizing unit 32 in FIG. 2, for example) for packetizing the data imported by the data import means; a buffer (a transmission buffer 33 in FIG. 2, for example) for accumulating the data which are packetized; transmitting means (a communications media access controller 34 in FIG. 2, for example) for transmitting to the receiving apparatus the data accumulated, in the buffer; clearing means (a buffer clearing unit 38 in FIG. 2, for example) for clearing the buffer at each time that a predetermined time is lapsed; number-of-data counting means (an untransmitted-packet counting unit 39 in FIG. 2, for example) for counting the number of the data not transmitted within the predetermine time; time measuring means (a transmission-idle-time measuring/counting unit 40 in FIG. 2, for example) for measuring a transmission idle time which lasts from a transmission completion time of the data to a clearing time of the buffer by the clearing means, in a case where all the data accumulated in the buffer are transmitted before the predetermined time is lapsed; and data, import controlling means (a compression controller 41 in FIG. 2, for example) for controlling a importing rate of the data, based on the number of the data counted by the number-of-data counting means or the transmission idle time measured by the time measuring means.

Hereinafter, with reference to drawings, an embodiment of the present invention is described.

FIG. 1 is a diagram showing a configuration of one embodiment of a communications system (the system here means that a plurality of devices are logically assembled, and it does not matter whether each device is housed in the same housing) to which the present invention is applied.

In FIG. 1, the communications system 1 is configured to include the transmitting apparatus 11, a network 12, and the receiving apparatus 13, and to wirelessly communicate A/V (audio/video) data stream in which audio and video (hereinafter, referred to as an "image") continuously stream.

The transmitting apparatus 11 compresses the A/V data stream (not shown) inputted from outside. The compressed data are segmented according to priority. The transmitting apparatus 11 includes an antenna 21, packetizes the compressed data with each priority, and transmits the resultant data in order of priority by the antenna 21 via the network 12 to the receiving apparatus 13.

The transmitting apparatus 11 and the receiving apparatus 13 are connected to the network 12. The network 12 is formed of a wireless LAN (local area network) which is a network using a wireless communication, for example, and allows the transmitting apparatus 11 and the receiving apparatus 13 to communicate with each other, according to a protocol such as RTP (Real-time Transport Protocol), for example.

The wireless communications may include a wireless LAN that complies with a standard such as IEEE (the institute of electrical and electronic engineers, Inc.) 802.11a, IEEE802.11b, or IEEE802.11g, and in addition thereto, a wireless communication that complies with a ustandard such as UWB (Ultra Wide Band), Bluetooth (registered trademark), and WiMax (worldwide interoperability for Microwave Access), for example.

In addition to the wireless communication, the network 12 may be a network using a wired communication that complies with a standard such as Ethernet (registered trademark), for example, and in addition, a network or a communication line, in which both sides are connected to each other, such as the Internet. The protocol used is not limited to the RTP, and other protocols used on a network of TCP/IP (Transmission Control Protocol/Internet Protocol), for example, may be used.

The receiving apparatus 13 includes an antenna 22, and receives by the antenna 22 via the network 12 the data transmitted from the transmitting apparatus 11. When the data are correctly received, the receiving apparatus 13 sends back ACK (acknowledgement) via the network 12 to the transmitting apparatus 11. The receiving apparatus 13 decompresses the received data, and outputs the audio and the image which correspond to the A/V data stream, which is the decompressed data.

In the communications system 1, in an example of FIG. 1, for the sake of simplicity, each of the transmitting apparatus 11, the network 12, and the receiving apparatus 13 is arranged as a single component, but may each be arranged as a plurality of components.

Figure 2:
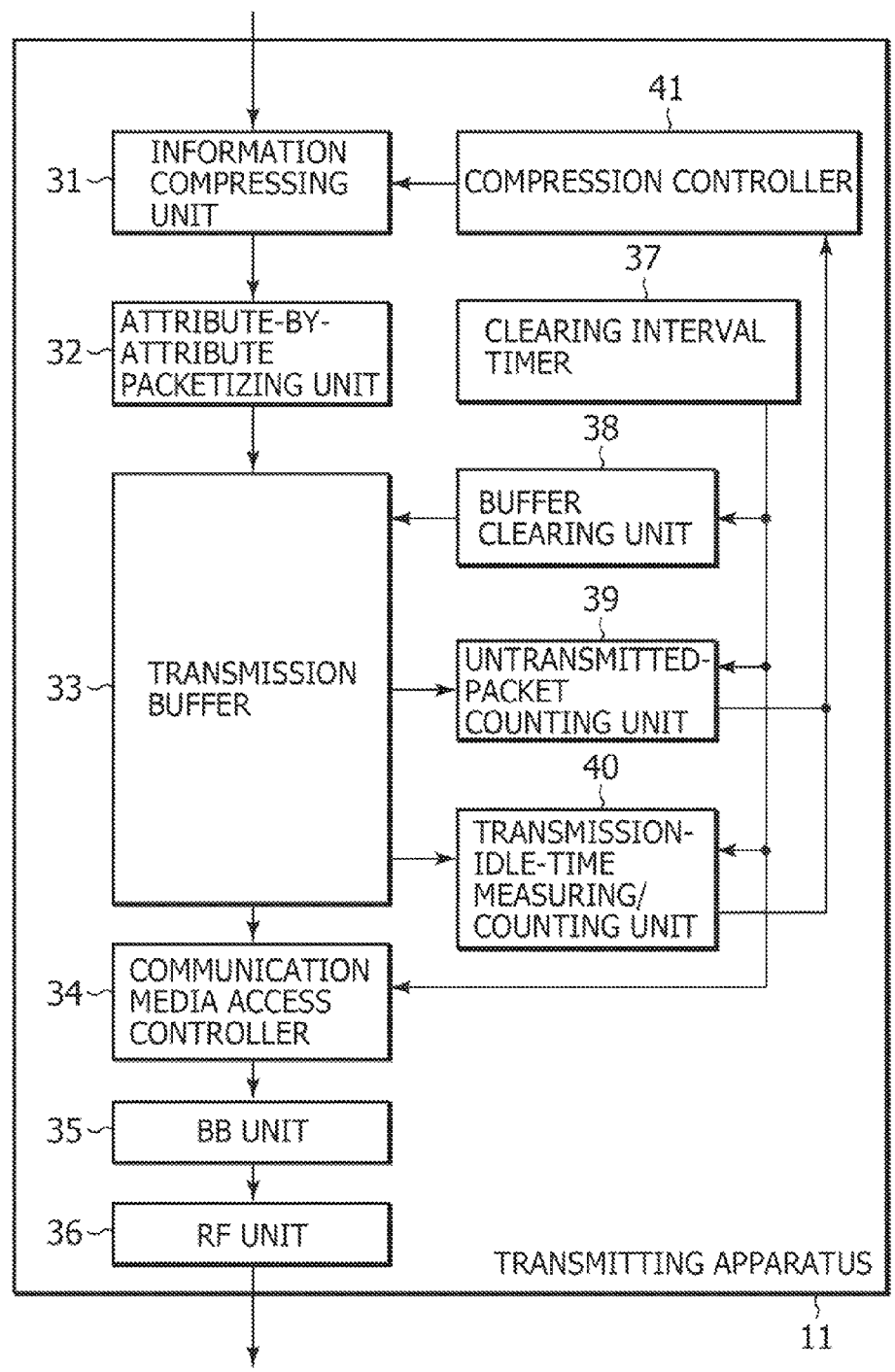
FIG. 2 is a block diagram showing a configuration example of a transmitting apparatus of FIG. 1.

FIG. 2 shows a configuration example of the transmitting apparatus 11 of FIG. 1.

In the example of FIG. 2, the transmitting apparatus 11 is configured to include: an information compressing unit 31; an attribute-by-attribute packetizing unit 32; the transmission buffer 33; an communications media access controller 34; an BB (base band) unit 35; an RF (radio frequency) unit 36; a clearing interval timer 37; a buffer clearing unit 38; an untransmitted-packet counting unit 39; a transmission-idle-time measuring/counting unit 40; and a compression controller 41.

The information compressing unit 31 is inputted the A/V data stream as information. The information compressing unit 31 compresses audio data, out of the A/V data stream, according to an encoding system such as ATRAC (Adaptive Transform Acoustic Coding) and MP3 (Moving Picture Experts 1 Audio layer 3), for example, and outputs the compressed audio data to the attribute-by-attribute packetizing unit 32.

Further, the information compressing unit 31 outputs to the attribute-by-attribute packetizing unit 32 data which are segmented into three stages, for example, according to priority, by compressing image data, out of the A/V data stream. For example, in the information compressing unit 31, a wavelet transform used in JPEG (Joint Photographic Experts Group) 2000 or the like is performed. It is noted that the segmentation according to the priority is not limited to three stages, and may be segmented into a plurality of stages such as two stages, four stages, or the like.

In a discrete wavelet transform, an original image undergoes a one-dimensional wavelet convolution for each horizontal pixel column, thereby to be divided into a sub image that includes low-frequency information and a sub image that includes high-frequency information. Each sub image further undergoes a similar convolution for each vertical pixel row thereby to be divided into two sub images of the low-frequency information and the high-frequency information.

That is, a baseband signal, which is the original image, is decomposed into four sub images (HH, HL, LH, and LL) as sub bands. The LL sub image includes the low-frequency information from the vertical and horizontal wavelet convolutions. The LH sub image includes the low-frequency image information from the horizontal wavelet convolution and the high-frequency image information from the vertical wavelet convolution. The HL sub image includes the high-frequency image information from the horizontal wavelet convolution and the low-frequency image information from the vertical wavelet convolution. The HH sub image includes the high-frequency image information from the vertical and horizontal wavelet convolutions. Each sub image is a quarter the size of the original image, and includes the number of data pieces a quarter that of the original image.

Such a wavelet transform is repeatedly performed on each obtained LL sub image. That is, when the sub images of a first decomposition level, which are obtained by performing the wavelet transform on the original image, are 1HH, 1HL, 1LH, and 1LL, respectively, and the wavelet transform is further performed on the 1LL sub image, which is further decomposed into sub images of a second decomposition level, that is, 2HH, 2HL, 2LH, and 2LL. The wavelet transform is once again performed on the 2LL sub image, which is further decomposed into sub images of a third decomposition level, that is, 3HH, 3HL, 3LH, and 3LL. In this manner, the wavelet transform is repeatedly performed, and in a transformed signal, the sub image forms a hierarchical structure.

Herein, a visual characteristic of the compressed data, is such that it is easier for a human to sense a lower band rather than a higher band, and it is still easier for a human to sense the audio. Therefore, the order in which the human finds it easier to sense (that is, the order of importance) is in descending order of: audio data; low-band image data of; mid-band image data; and high-band image data. In this specification, the terms "low-band image data", "mid-band image data" and "high-band image data" respectively means "low-band data of a certain image", "mid-band data of the image" and "high-band data of the image". Thus, the order of priority is in descending order of: the audio data, the low-band image data, the mid-band image data, and the high-band image data.

That is, in the information compressing unit 31, the above-described wavelet transforms is performed on the image data. The image data which are segmented into three stages of: a low band of which frequency component is low and in which the priority is the highest in the image (3HH, 3HL, 3LH, and 3LL, for example); a mid band of which frequency component is intermediate and in which the priority is the second highest (2HH, 2HL, and 2LH, for example); and a high band of which frequency component is high and in which the priority is low (1HH, 1HL, and 1LH, for example) are outputted to the attribute-by-attribute packetizing unit 32. Therefore, when the audio data are included, the data of four types of priorities (hereinafter, appropriately referred also to as an "attribute") are inputted from the information compressing unit 31 into the attribute-by-attribute packetizing unit 32.

The attribute-by-attribute packetizing unit 32 packetizes the data of four types of attributes by each attribute in order of priority, and allows the transmission buffer 33 to accumulate the packetized data, in the transmission buffer 33, the audio data, the low-band data of an image, the mid-band data of an image, and the high-band data of an image, each of which are packetized by each attribute, are accumulated.

The communications media access controller 34 outputs to the BB unit 35 the data accumulated in the transmission buffer 33 in order of priority (that is, in the order of the audio data, the low-band data of an image, the mid-band data of an image, and the high-band data of an image). After outputting the data, the communications media access controller 34 receives, from the BB unit 35, the ACK received via the network 12, from the receiving apparatus 13. Then, the communications media access controller 34 deletes the transmitted data from the transmission buffer 33, and outputs to the BB unit 35 the data which are the second highest in priority. When no ACK is inputted from the receiving apparatus 13, the communications media access controller 34 outputs the transmitted data to the BB unit 35 once again.

When a clearing timing is supplied from the clearing interval timer 37, the communications media access controller 34 waits until the buffer clearing unit 38 clears the transmission buffer 33 and the subsequent data are accumulated in the transmission buffer 33.

When receiving a radio wave, the BB unit 35 demodulates the baseband signal supplied from the RF unit 36, and outputs to the communications media access controller 34 the data obtained by demodulation. When transmitting the radio wave, the BB unit 35 modulates the data inputted from the communications media access controller 34 or the like, and outputs to the RF unit 36 the baseband signal obtained by modulation.

When receiving the radio wave, the RF unit 36 modulates a receive signal received by the antenna 21 into an intermediate wave, performs detection, and outputs the detected baseband signal to the BB unit 35. When transmitting the radio wave, the RF unit 36 modulates the baseband signal inputted from the BB unit 35 into a predetermined transmission signal, and outputs the modulated transmission signal to the antenna 21.

The clearing interval timer 37 performs a timing operation. When a predetermined clearing interval is lapsed, the clearing interval timer 37 supplies a clearing timing for clearing the data of the transmission buffer 33 to the buffer clearing unit 38, the untransmitted-packet counting unit 39, the transmission-idle-time measuring/counting unit 40, and the communications media access controller 34.

The buffer clearing unit 38 clears the data remaining in the transmission buffer 33 in response to the clearing timing supplied from the clearing interval timer 37. When the clearing timing is supplied from the clearing interval timer 37, the untransmitted-packet counting unit 39 counts the number of untransmitted packets remaining in the transmission buffer 33 in a built-in counter, and outputs the counted number of untransmitted packets to the compression controller 41.

The transmission-idle-time measuring/counting unit 40 monitors the data accumulated in the transmission buffer 33. In a case where data accumulated in the transmission buffer 33 runs out before the clearing timing is supplied from the clearing interval timer 37, the transmission-idle-time measuring/counting unit 40 measures a transmission idle time which lasts from a time that the there remain no data (that is, when a transmission of all the data is completed) to a time that the clearing timing is supplied from the clearing interval timer 37. The transmission-idle-time measuring/counting unit 40 outputs the measured transmission idle time to the compression controller 41. Further, in the case where the clearing timing is supplied from the clearing interval timer 37 before data accumulated in the transmission buffer 33 runs out, the transmission-idle-time measuring/counting unit 40 outputs the transmission idle time (0) to the compression controller 41.

When at least one of the number of untransmitted packets from the untransmitted-packet counting unit 39 and the transmission idle time from the transmission-idle-time measuring/counting unit 40 is inputted, the compression controller 41 judges that the data of the transmission buffer 33 are cleared by the buffer clearing unit 38, and on the basis of the number of untransmitted packets or the transmission idle time, controls a compression rate by the information compressing unit 31. For example, in a case where the wavelet transform is used in the information compressing unit 31, control such as changing a filter and so on is performed.

Figure 3:
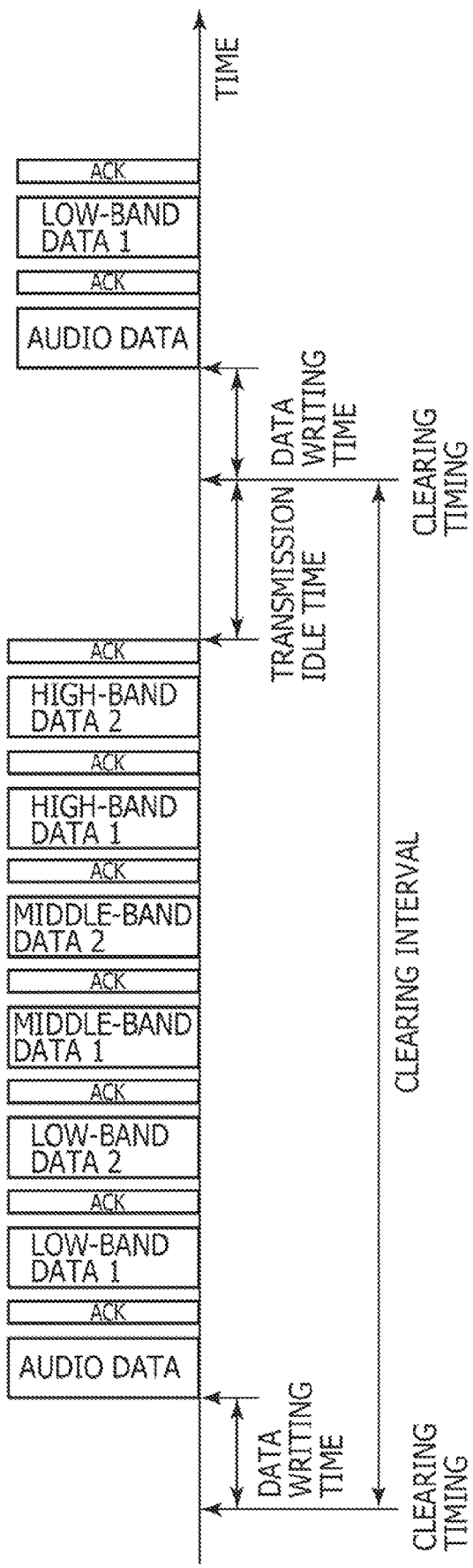
FIG. 3 is a diagram showing an example of a transmit sequence of a packet by the communications system of FIG. 1.

FIG. 3 shows an example of a transmit sequence of a packet by the communications system 1 in FIG. 1. In the example of FIG. 3, there is shown an example where a wireless communication quality is good, and a correct data communication is performed when the audio data have one packet, and the low-band image data, the mid-band image data, and the high-band image data have two packets, respectively.

The clearing interval timer 37 of the transmitting apparatus 11 measures a previously set clearing interval from a last clearing timing, and when the clearing interval is lapsed, the clearing interval timer 37 repeats a process for supplying a subsequent clearing timing to each unit.

After a data writing time into the transmission buffer 33 is lapsed since the last clearing timing is supplied from the clearing interval timer 37, the communications media access controller 34 transmits to the receiving apparatus 13 a packet of the audio data of which priority is the highest, out of the data written into the transmission buffer 33. In response thereto, in a case where the receiving apparatus 13 correctly receives the packet of the audio data, the receiving apparatus 13 sends back an ACK for the audio data.

When receiving the ACK for the audio data, the communications media access controller 34 recognizes that the transmission of the audio data is completed, and deletes the packet of the audio data from the transmission buffer 33. Subsequently, the communications media access controller 34 transmits to the receiving apparatus 13 a packet of low-band image data-1 which is the second highest priority next to the audio data. In response thereto, in a case where the receiving apparatus 13 correctly receives the packet of the low-band image data-1, the receiving apparatus 13 sends back an ACK for the low-band image data-1.

When the ACK for the low-band image data-1 is received, the communications media access controller 34 recognizes that the transmission of the low-band image data-1, and deletes the packet of the low-band image data-1 from the transmission buffer 33. Hereinafter, in a similar manner, in the communications media access controller 34, packets of low-band image data-2, mid-band image data-1, mid-band image data-2, high-band image data-1, and high-band image data-2 are transmitted in this order to the receiving apparatus 13. When an ACK sent back from the receiving apparatus 13 is received for each data, the transmission completion of the data is recognized. Consequently, the corresponding packet in the transmission buffer 33 is deleted.

Herein, in the case of an example of FIG. 3, when the ACK for the high-band image data-2 is received and the transmission completion of the high-band image data-2 is thus recognized, a subsequent clearing timing is not yet supplied. That is, there is a time after a time that the ACK for the high-band image data-2 is received and before the subsequent clearing timing by the clearing interval timer 37. Therefore, the transmission-idle-time measuring/counting unit 40 measures the time, and supplies the measured transmission idle time, as one parameter of control information, to the compression controller 41. Based thereon, the compression controller 41 considers that there is a sufficient time before the transmission time, and thus, controls to decrease a compression rate of the data by the information compressing unit 31.

Thereafter, when the clearing interval is lapsed, the subsequent clearing timing is supplied by the clearing interval timer 37. When the data writing time into the transmission buffer 33 is lapsed since the clearing timing is supplied from the clearing interval timer 37, the communications media access controller 34, similarly to the above case, repeats a process of transmitting the data written into the transmission buffer 33 according to the priority, and receiving the corresponding ACK.

Thus, it is designed such that based on the transmission idle time which lasts since all the data of the transmission buffer 33 are transmitted to a time that the clearing timing is supplied, the compression rate of the data is controlled. Thus, when a wireless communication quality is good and there is a sufficient time for the transmission time, the compression rate of the data may be decreased to improve the quality of the transmitted data.

Figure 4:
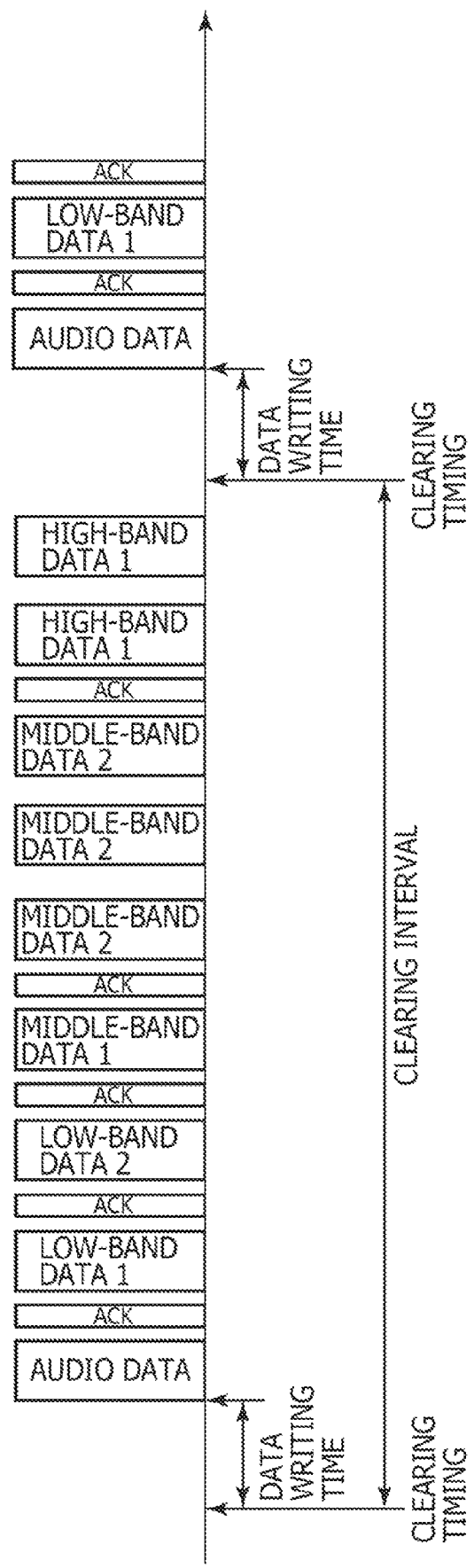
FIG. 4 is a diagram showing another example of a transmit sequence of a packet by the communications system of FIG. 1.

FIG. 4 shows another example of the transmit sequence of a packet by the communications system 1 in FIG. 1. The example of FIG. 4 indicates a case where the audio data have one packet, and the low-band image data, the mid-band image data, and the high-band image data have two packets, respectively, and unlike the case of the example in FIG. 3, there is shown an example in which the wireless communication quality is poor and a correct data communication cannot be performed, thereby leading to a need of a data re-transmission.

Similar to the case of the example of FIG. 3, the clearing interval timer 37 of the transmitting apparatus 11 measures the previously set clearing interval from the last clearing timing, and when the clearing interval is lapsed, the clearing interval timer 37 repeats a process for supplying a subsequent clearing timing to each unit.

Similar to the case of the example of FIG. 3, when the data writing time into the transmission buffer 33 is lapsed since the last clearing timing is supplied from the clearing interval timer 37, the communications media access controller 34 transmits to the receiving apparatus 13 a packet of the audio data of which priority is the highest, out of the data written in the transmission buffer 33. In response thereto, in a case where the receiving apparatus 13 correctly receives the packet of the audio data, the receiving apparatus 13 sends back an ACK for the audio data.

When receiving the ACK for the audio data, the communications media access controller 34 recognizes that the transmission of the audio data is completed, and deletes the packet of the audio data from the transmission buffer 33. Hereinafter, in a similar manner, in the communications media access controller 34, the packets of the low-band image data-1, 2 and the mid-band image data-1 thereof are transmitted to the receiving apparatus 13 in this order, and when an ACK sent back from the receiving apparatus 13 is received for the low-band image data-1, 2 and the mid-band image data-1, the transmission completion of the data is recognized, and thus, the corresponding packet of the transmission buffer 33 is deleted.

Subsequently, the communications media access controller 34 transmits to the receiving apparatus 13 a packet of the mid-band image data-2. However, in this case, the wireless communication quality is poor, and the mid-band image data-2 is not correctly received by the receiving apparatus 13. As a result, the communications media access controller 34 receives no ACK for the mid-band image data-2 from the receiving apparatus 13. Therefore, the communications media access controller 34 transmits to the receiving apparatus 13 the packet of the mid-band image data-2 once again. However, the communications media access controller 34 receives no ACK for the mid-band image data 2 from the receiving apparatus 13 again. Therefore, the communications media access controller 34, for this time again, transmits to the receiving apparatus 13 the packet of the mid-band image data-2.

In response thereto, this time, the packet of the mid-band image data-2 is correctly received by the receiving apparatus 13, and the receiving apparatus 13 sends back an ACK for the mid-band image data-2. Thus, the communications media access controller 34 recognizes that the transmission of the mid-band image data-2 is completed, and deletes the packet of the mid-band image data-2 from the transmission buffer 33. Subsequently, the communications media access controller 34 transmits a packet of the high-band image data-1 to the receiving apparatus 13.

Similar to the case of the mid-band image data-2, the communications media access controller 34 receives no ACK for the high-band image data-1 from the receiving apparatus 13. Thus, the communications media access controller 34 transmits to the receiving apparatus 13 the packet of the high-band image data-1 once again. However, in this case, the clearing interval is lapsed before an ACK for the high-band image data-1 is received, and thus, the subsequent clearing timing is supplied to each unit of the transmitting apparatus 11 by the clearing interval timer 37.

At this time, within the transmission buffer 33, there remain two packets, as untransmitted packets, of the high-band image data-1 and the high-band image data-2. Therefore, in the untransmitted-packet counting unit 39, the number of untransmitted packets is counted, and the counted number of untransmitted packets is supplied, as one parameter of the control information, to the compression controller 41. Based thereon, in order for all the data to be transmitted, for example, the compression controller 41 controls to increase the compression rate of the data by the information compressing unit 31.

Then, after the clearing timing from the clearing interval timer 37 is supplied, and when the data writing time into the transmission buffer 33 is lapsed, the communications media access controller 34, similarly to the above-described process, repeats a process of transmitting the data written into the transmission buffer 33 according to the priority and of receiving the corresponding ACK.

Thus, it is designed such that when the clearing interval is lapsed and the clearing timing is thereafter supplied, the compression rate of the data is controlled depending on the number of data remaining in the transmission buffer 33. Thus, if the wireless communication quality is poor, it may be possible to transmit all the packets, although the compression rate of the data is increased, and thus, the quality of the transmitted data, deteriorates.

Figure 5:
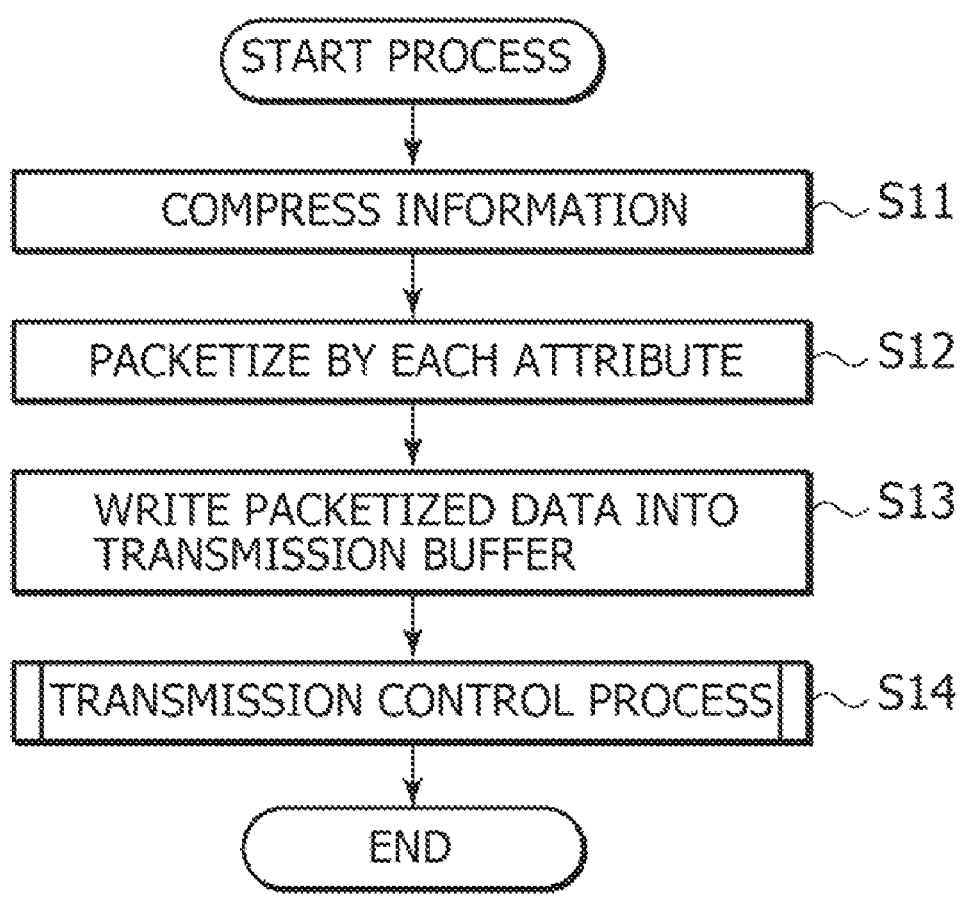
FIG. 5 is a flowchart for explaining a process of the transmitting apparatus of FIG. 1.

Subsequently, with reference to a flowchart in FIG. 5, a description is given of a process of the transmitting apparatus 11 in FIG. 1.

The information compressing unit 31 receives the A/V data stream as information transmitted to the receiving apparatus 13. At step S11, the information compressing unit 31 compresses the information, and outputs the compressed information to the attribute-by-attribute packetizing unit 32.

That is, the information compressing unit 31 compresses the audio data, out of the A/V data stream, according to an encoding system such as ATRAC or the like, for example, and outputs the compressed audio data to the attribute-by-attribute packetizing unit 32. Further, the information compressing unit 31 outputs to the attribute-by-attribute packetizing unit 32 the data which are segmented into three stages according to the priority (the low-band image data, the mid-band image data, and the high-band image data), for example, by compressing the image data, out of the A/V data stream, by the wavelet transform, for example.

At step S12, the attribute-by-attribute packetizing unit 32 packetizes the data of four types of attributes, that is, the audio data, the low-band image data, the mid-band image data, and the high-band image data, into each attribute, according to the order of priority.

At step S13, after the data of the transmission buffer 33 are cleared by the buffer clearing unit 38, the attribute-by-attribute packetizing unit 32 writes the audio data, the low-band image data, the mid-band image data, and the high-band image data, each of which are packetized by each attribute, into the transmission buffer 33, according to the order of priority. Thereby, the data are accumulated into the transmission buffer 33.

At step S14, the communications media access controller 34 executes a transmission control process. By the transmission control process, the data accumulated in the transmission buffer 33 are transmitted via the network 12 to the receiving apparatus 13. Then, the process is ended.

With reference to a flowchart in FIG. 6, the transmission control process at the step S14 is described further in detail. The transmission control process is begun when the data of the transmission buffer 33 are cleared by the buffer clearing unit 38, and firstly, the audio data packetized by each attribute are written into the transmission buffer 33. It is noted that it may also be possible to configure to start the transmission control process after all the data are written.

At step S31, the communications media access controller 34 transmits the data (the audio data, the low-band image data, the mid-band image data, and the high-band image data, for example) accumulated in the transmission buffer 33 in order of priority.

For example, the communications media access controller 34 outputs to the BB unit 35 the packet of the audio data of which priority is the highest. The BB unit 35 modulates the data inputted from the communications media access controller 34 or the like, and outputs to the RF unit 36 the baseband signal obtained by modulation. The RF unit 36 modulates the baseband signal inputted from the BB unit 35 into a predetermined transmission signal, and outputs the modulated transmission signal to the antenna 21. The antenna 21 transmits the transmission signal via the network 12 to the receiving apparatus 13.

The clearing interval timer 37 performs a timing operation, and judges whether the clearing interval is lapsed at step S32. When it is judged that the clearing interval is lapsed at the step S32, the clearing timing from the clearing interval timer 37 is supplied to the buffer clearing unit 38, the untransmitted-packet counting unit 39, the transmission-idle-time measuring/counting unit 40, and the communications media access controller 34, and the process proceeds to step S38.

At the step S32, when it is determined that the clearing interval is not yet lapsed, the process proceeds to step S33. At the step S33, the communications media access controller 34 judges whether the ACK is received. When the transmission signal from the transmitting apparatus 11 is not correctly received by the receiving apparatus 13, the ACK is designed not to be transmitted. In this case, at the step S33, it is judged that the ACK is not received, and the process proceeds to step S34.

At the step S34, the communications media access controller 34 transmits the same data as that transmitted at the step S31 once again. Thereafter, the process returns to the step S32, and the processes that follow are repeated.

On the other hand, the antenna 22 receives the transmission signal from the transmitting apparatus 11, for example, transmitted at the step S31, via the network 12, and outputs it to the receiving apparatus 13. When the receiving apparatus 13 correctly receives the transmission signal, the receiving apparatus 13 is designed to transmit the ACK for the transmission signal via the antenna 22 and the network 12.

The antenna 21 receives the signal corresponding to the ACK from the receiving apparatus 13, and outputs, as the receive signal, to the RF unit 36. The RF unit 36 modulates the receive signal received by the antenna 21 into an intermediate wave, performs detection, and outputs the detected baseband signal to the BB unit 35. The BB unit 35 demodulates the baseband signal supplied from the RF unit 36, and outputs to the communications media access controller 34 the data (ACK) obtained by modulation.

In this case, at the step S33, it is judged that the ACK is received, and the process proceeds to step S35. At the step S35, the transmission-idle-time measuring/counting unit 40 judges whether all the data are transmitted. When there remain no data accumulated in the transmission buffer 33, it is judged that all the data are transmitted at the step S35, and the process proceeds to step S36.

At the step S36, the transmission-idle-time measuring/counting unit 40 starts measuring the transmission idle time since data accumulated in the transmission buffer 33 runs out, that is, after the transmission of all the data of the transmission buffer 33 is completed.

At step S37, the clearing interval timer 37 judges whether the clearing interval is lapsed, and waits until it is judged that the clearing interval time is lapsed. At the step S37, when it is judged that the clearing interval is lapsed, the clearing interval timer 37 supplies the clearing timing to the buffer clearing unit 38, the untransmitted packet counting unit 39, the transmission-idle-time measuring/counting unit 40, and the communications media access controller 34.

At the step S38, in response to the clearing timing from the clearing interval timer 37, the transmission-idle-time measuring/counting unit 40 stops measuring the transmission idle time, and outputs the measured transmission idle time to the compression controller 41. That is, in the transmission-idle-time measuring/counting unit 40, the transmission idle time, which lasts from a start of measuring the transmission idle time at the step S36 when data accumulated in the transmission buffer 33 runs out to a time that the clearing timing is supplied from the clearing interval timer 37 at the step S37, is measured.

When it is judged that the clearing interval is lapsed at the step S32, this is before data accumulated in the transmission buffer 33 runs out, and thus, the transmission-idle-time measuring/counting unit 40 outputs the transmission idle time (0) to the compression controller 41.

At step S39, in response to the clearing timing from the clearing interval timer 37, the untransmitted-packet counting unit 39 counts the number of untransmitted packets remaining in the transmission buffer 33 in the built-in counter, and outputs the counted number of untransmitted packets to the compression controller 41. When it is determined that the clearing interval is lapsed at the step S37, this means that there remain no data accumulated in the transmission buffer 33, and thus, the number of untransmitted packets (0) is outputted to the compression controller 41.

At step S40, in response to the clearing timing supplied from the clearing interval timer 37, the buffer clearing unit 38 clears the data remaining in the transmission buffer 33. Thereby, the transmission control process ends.

Thus, in the transmitting apparatus 11, even when the quality of communication path is poor, the important data are transmitted preferentially. In the transmitting apparatus 11, when some data remain in the transmission buffer 33, or when no data remains in the transmission buffer 33, if the clearing interval is lapsed, the transmission idle time and the number of untransmitted packets are outputted to the compression controller 41 in each case.

In response thereto, the compression controller 41 executes a compression-rate control process shown in a flowchart in FIG. 7.

At step S51, the compression controller 41 waits until it is judged that the data within the transmission buffer 33 are cleared. The compression controller 41 receives the transmission idle time outputted from the transmission-idle-time measuring/counting unit 40 at the step S38 in FIG. 6. At the step S39, the compression controller 41 receives the number of untransmitted packets outputted from the untransmitted-packet counting unit 39.

When the compression controller 41 receives the transmission idle time and the number of untransmitted packets, it is judged that the data within the transmission buffer 33 are cleared, at the step S51, and the process proceeds to step S52. It may also be possible to configure to judge that the data within the transmission buffer 33 are cleared when at least one of the transmission idle time and the number of untransmitted packets is inputted.

At the step S52, the compression controller 41 judges whether the transmission idle time from the transmission-idle-time measuring/counting unit 40 is 20% or more of the clearing interval. At the step S52, when it is judged that the transmission idle time from the transmission-idle-time measuring/counting unit 40 is 20% or more of the clearing interval, the process proceeds to step S53.

At the step S53, the compression controller 41 controls the information compressing unit 31 to decrease the image compression rate by 5%. As a result, the image data itself increases by 5%, for example, and however, the transmission idle time which is 20% or more is merely changed to 15%, for example. Thus, the decrease in compression rate enables improvement of the quality of the image received by the receiving apparatus 13.

At this time, in response to the control by the compression controller 41, the information compressing unit 31 may decrease the image compression rate by 5% from the subsequent data. Alternatively, if the compression of the subsequent data is already begun, the information compressing unit 31 may decrease the image compression rate by 5% from data following the subsequent data. That is, a changing timing of the compression rate is arbitrary.

At the step S52, when it is determined that the transmission idle time from the transmission-idle-time measuring/counting unit 40 is not 20% or more of the clearing interval, the process proceeds to step S54.

At the step S54, the compression controller 41 judges whether there is an untransmitted packet in the transmission buffer 33, on the basis of the number of untransmitted packets from the untransmitted-packet counting unit 39. At the step S54, when it is judged that there is an untransmitted packet, the process proceeds to step S55. At the step S55, the compression controller 41 determines whether the number of untransmitted packets is 2 or more, depending on the number of untransmitted packets from the untransmitted-packet counting unit 39.

At the step S55, when it is determined that the number of untransmitted packets is less than 2, that is, the number is 1, the process proceeds to step S56. At the step S56, the compression controller 41 controls the information compressing unit 31 to increase the image compression rate by 5%. As a result, although the image quality is slightly deteriorated, it may also be possible to transmit the remaining one packet.

At the step S55, when it is determined that the number of untransmitted packets is 2 or more, the process proceeds to step S57. At the step S57, the compression controller 41 controls the information compressing unit 31 to increase the image compression rate by 10%. As a result, the compression rate is further increased as compared to the case at the step S56, and thus, although the image quality is further decreased, it may be possible to transmit all the packets.

As described above, the important data are preferentially transmitted, and the compression rate is adapted at each clearing of the transmission buffer 33. Thus, it may be possible to transmit all the packets even when the quality of the image is lowered where the communication path is poor, and possible to increase the quality of the streaming image while transmitting all the packets where the communication path is good. That is, it may be possible to control such that the appropriate communication is performed. Thereby, it may become possible to stabilize the delay time, which is emphasized in the streaming, or the like, for example.

Figure 8:
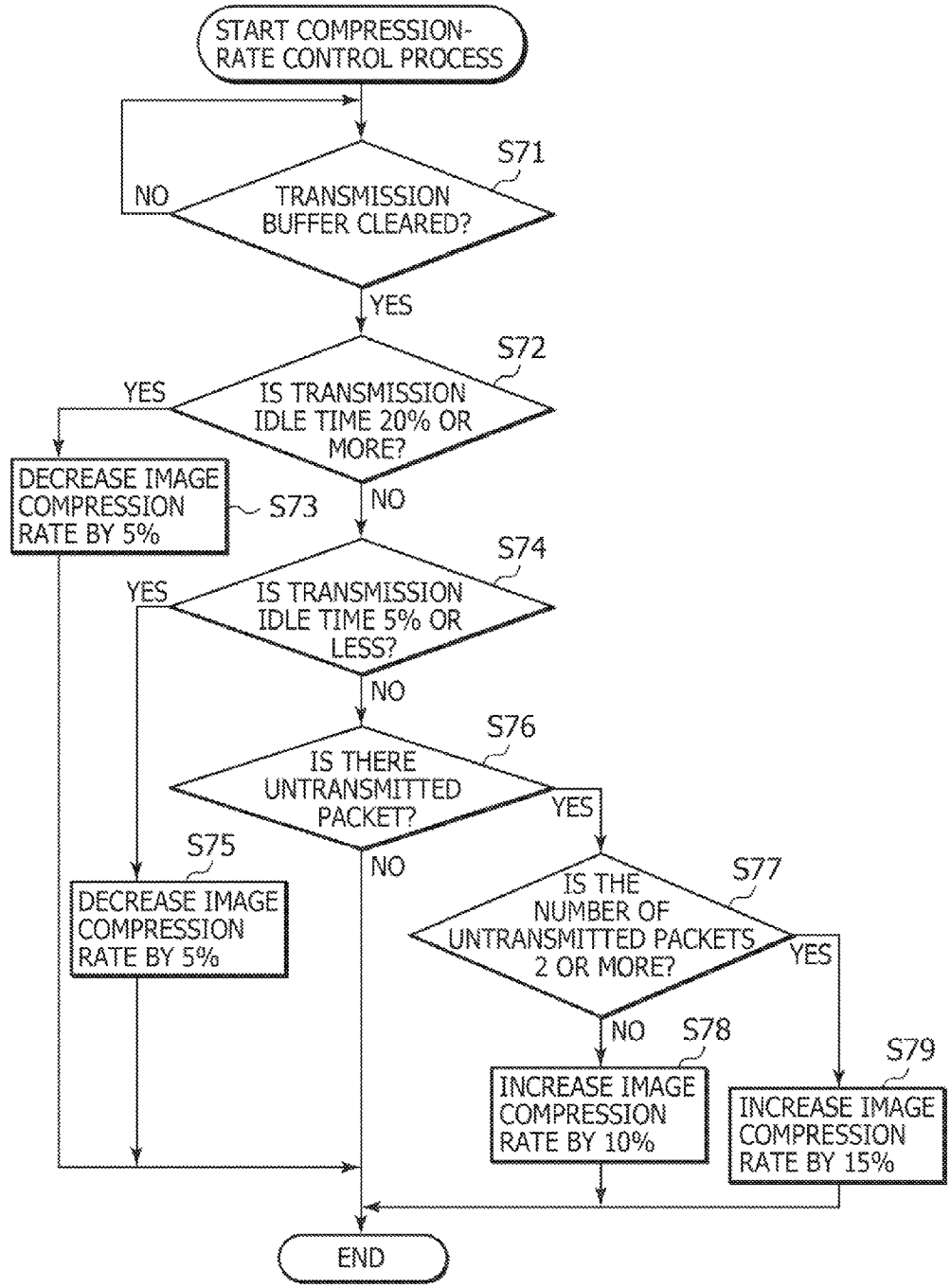
FIG. 8 is a flowchart for explaining another example of the compression-rate control process of the transmitting apparatus of FIG. 1.

With reference to a flowchart in FIG. 8, another example of the compression-rate control process in FIG. 7 is described. It is noted that in the example in FIG. 8, the adjustment by the compression rate is emphasized such that discarding of packets is further minimized as much as possible, as compared to the case in the example in FIG. 7. At Steps S71, S72, S73, S76, and S77, the processes similar to those at the steps S51, S52, S53, S54, and S55 in FIG. 7 are performed, and thus, to avoid repetition, its detailed description is omitted.

At step S71, the compression controller 41 waits until it is judged that the data within the transmission buffer 33 are cleared. When it is judged that the data within the transmission buffer 33 are cleared at the step S71, the process proceeds to step S72. At the step S72, the compression controller 41 judges whether the transmission idle time from the transmission-idle-time measuring/counting unit 40 is 20% or more of the clearing interval.

At the step S72, when it is judged that the transmission idle time from the transmission-idle-time measuring/counting unit 40 is 20% or more of the clearing interval, the process proceeds to step S73. At the step S73, the compression controller 41 controls the information compressing unit 31 to decrease the image compression rate by 5%.

At the step S72, when it is determined that the transmission idle time from the transmission-idle-time measuring/counting unit 40 is not 20% or more of the clearing interval, the process proceeds to step S74.

At the step S74, the compression controller 41 further judges whether the transmission idle time from the transmission-idle-time measuring/counting unit 40 is 5% or less of the clearing interval. At the step S74, when it is judged that the transmission idle time from the transmission-idle-time measuring/counting unit 40 is 5% or less of the clearing interval, the process proceeds to the step S75. At the step S75, the compression controller 41 controls the information compressing unit 31 to increase the image compression rate by 5%.

At the step S74, when it is judged that the transmission idle time from the transmission-idle-time measuring/counting unit 40 is 5% or more of the clearing interval, the process proceeds to step S76. At the step S76, the compression controller 41 judges whether there is the untransmitted packet in the transmission buffer 33, depending on the number of untransmitted packets from the untransmitted-packet counting unit 39. At the step S76, when it is judged that there is the untransmitted packet, the process proceeds to step S77. At the step S77, the compression controller 41 judges whether the number of untransmitted packets is 2 or more, depending on the number of untransmitted packets from the untransmitted-packet counting unit 39.

At the step S77, when it is judged that the number of untransmitted packets is less than 2, that is, the number is 1, the process proceeds to step S78. At the step S78, the compression controller 41 controls the information compressing unit 31 to increase the image compression rate by 10%.

At the step S77, when it is judged that the number of untransmitted packets is 2 or more, the process proceeds to step S79. At the step S79, the compression controller 41 controls the information compressing unit 31 to increase the image compression rate by 15%.

As described above, in the case of the example of FIG. 7, the compression rate is adapted such that the transmission idle time converges within a range of 0% to 20%, and thus, a packet discarding probably occurs. However, in the case of the example of FIG. 8, the compression rate is adapted such that the transmission idle time converges within a range of 5% to 15%, and thus, a packet discarding does not easily occur.

The compression control processes in FIG. 7 and FIG. 8 are mere examples, and a length of the appropriate transmission idle time, and addition or subtraction of the compression rate are preferably selected according to a compression method, an image size, or the like.

FIG. 9 shows another configuration example of the transmitting apparatus 11 of FIG. 1. In the example of FIG. 9, the transmitting apparatus 11 is configured similarly to that of FIG. 2 in that it includes: the information compressing unit 31; the attribute-by-attribute packetizing unit 32; the transmission buffer 33; the communications media access controller 34; the BB unit 35; the RF unit 36; the clearing interval timer 37; the buffer clearing unit 38; the untransmitted-packet counting unit 39; the transmission-idle-time measuring/counting unit 40; and the compression controller 41. However, the transmitting apparatus 11 differs only in that the transmission buffer 33 of FIG. 9 is configured with a buffer 61 and a buffer 62.

The transmission buffer 33 of FIG. 9 is configured with the buffer 61 and the buffer 62. In the transmitting apparatus 11 of FIG. 9, when clearing the buffer 61, for example, a buffer which is accessed by the communications media access controller 34 can be switched to the buffer 62. To the contrary, when clearing the buffer 62, a buffer which is accessed by the communications media access controller 34 can be switched to the buffer 61.

That is, when the communications media access controller 34 transmits the data accumulated in the buffer 61, the attribute-by-attribute packetizing unit 32 accumulates in the buffer 62 the audio data, the low-band image data, the mid-band image data, and the high-band image data, each of which are packetized by each attribute, according to the priority. Further, when the communications media access controller 34 transmits the data accumulated in the buffer 62, the attribute-by-attribute packetizing unit 32 accumulates in the buffer 62 the audio data, the low-band image data, the mid-band image data, and the high-band image data, each of which are packetized by each attribute, according to the priority.

Thereby, the data writing time after the clearing timing shown in FIG. 3 and FIG. 4, for example, is reduced, and thus, it may be possible to reduce a time loss which occurs from the clearing time to the transmission to the receiving apparatus 13.

In this case also, the changing timing of the compression rate is arbitrary. However, when the compression rate is controlled on the basis of the transmission idle time of the data accumulated in the buffer 61 or the number of untransmitted packets, for example, the data are already accumulated in the buffer 62, and thus, the compression rate is controlled from data to be subsequently accumulated in the buffer 61.

In the process of the transmitting apparatus 11 of FIG. 9, a process basically similar to that of the transmitting apparatus 11 of FIG. 2 is performed, and thus, to avoid the repetition, its description and illustration are omitted. The transmission buffer 33 is not only configured with two buffers, but also may be configured of a plurality of, for example 3, of buffers.

As described above, the communications system 1 in FIG. 1 is configured such that, even when the quality of the communication path is poor, the important data are preferentially transmitted by the transmitting apparatus 11, the transmission buffer 33 is regularly cleared, and the compression rate is adapted based on the transmission idle time and the number of untransmitted packets at each clearing of the transmission buffer 33. Thus, the communication may be optimally controlled such that all the packets are transmitted even though the quality of the image is lowered where the communication path is poor, the quality of the streaming image is increased while transmitting all the packets where the communication path is good, and so on.

Thereby, it may become possible to stabilize the delay time which is emphasized, in the streaming or the like, thereby providing a user with a convenient streaming environment.

Further, in the communications system 1, the compression rate is controlled depending not only on information which is higher in hierarchy than the transmission buffer on the transmission side only, that is, the information from the receiving apparatus 13, but depending also on the transmission idle time and the number of untransmitted packets which are obtainable within the transmitting apparatus 11. Thereby, it may be possible to control the communication of the communications system 1.

As a result, unlike the conventional case where many buffers are used, it may become possible to control the communication of the communications system 1 without being influenced by a communication condition (an error rate or a characteristic of S/N) from the receiving side, and the dependence on a lower hierarchy is low, and thus, it may also become possible to adapt to a communication by a different medium. Therefore, it may be possible to perform the optimal communication without depending on the communications media.

In the above description, an example in which the compression rate of the data is controlled is described. However, in a communication in which when the transmission speed is lowered, the quality in communication is improved, it may be possible to control such that the transmission speed is adapted, for example, by changing not only the compression rate of the data but also changing a modulation in the BB unit 35 according to the transmission idle time.

In the above description, an example where the data are transmitted from a low-frequency side (in order of importance of priority) is described. However, the data may be transmitted from a high-frequency side, for example, and the data may be transmitted from any frequency. In this case, an amount of change of the compression rate of the data may vary according to the importance of the untransmitted packet.

Further, in the above description, an example in which the wavelet transform is used as a compression method is described. The compression method is not limited to the wavelet transform, and the above-described embodiment may be applied to any compression method (line-based wavelet transform or MPEG (Moving Picture Experts Group), etc., for example) as long as it is a compression method in which the data is segmented, depending on the priority.

That is, in the line-based wavelet transform, a wavelet transform in a horizontal direction is performed at each time that one line of a baseband signal of an original image is scanned, and a wavelet transform in a vertical direction is performed at each time that a constant line is read. For example, when the wavelet transform in the vertical direction is performed in each baseband 8 lines, and a 3-level wavelet decomposition is applied, with respect to the 8 lines, generated are: one line of a lowest-band 3 LL sub image; one line of each sub-band 3H (3HL, 3LH, and 3HH) of the subsequent level; two lines of each sub-band 2H (2HL, 2LH, and 2HH) of the further subsequent level; and four lines of each highest-band 1H (1HL, 1LH, and 1HH).

An aggregate of a line of each sub-band is referred to as a precinct. That is, one precinct indicates the number of lines which are processing units of the line-based wavelet transform. An aggregate of a line of a sub-band (other than 3LL, composed of three sub-bands) of each level in the precinct is referred to as an align unit. That is, a sub-band of one precinct is composed of four align units (3LL, 3H, 2H, and 1H).

That is, for example, the precinct which is eight lines in the baseband signal is configured in 1H of a transformed signal, to which line-base wavelet transform is applied, as four lines of each 1HL, 1LH, and 1HH, and in 2H of two lines of each 2HL, 2LH, and 2HH, and one line of each 3LL, 3HL, 3HL, and 3HH.

In such a line-based wavelet transform process, it may be possible to process by decomposing one piece of picture into a finer particle level, and by using this transform process, it may be possible to implement to further lower the delay.

To utilize the advantages of the wavelet, it may be necessary to transmit one precinct data, for example, 3LL, 3H, 2H, and 1H by a separate packet. However, when a packet size is small, an overhead of a header or the like of a physical layer or an MAC layer in a radio transmission may become large, and due to an increase in packet number, a transmission efficiency may deteriorate. In this case, for example, the data of the precinct are divided by each frequency component and once accumulated for packetization by each frequency component, and thus, the data by each importance may be transmitted.

On the other hand, in the case of the MPEG, generally, a transmission in picture units is performed within the transport stream, and decoding is performed by each frame unit. Thus, it is not possible to consider to divide into a high frequency component and a low frequency component. However, for example, it may be possible to configure such that an end time of transmission assigned to each frame is previously determined, and when the transmission is not complete even when the time is lapsed, the compression rate is changed (for example, control such as changing a quantization coefficient, changing a transmission subject of a DCT (Discrete Cosine Transform) coefficient, and so on, is performed) from a subsequent GOP (Group Of Picture).

A series of above-described processes may be executed by hardware, but may be executed by software as well.

When the series of processes are executed by the software, a program configuring the software is installed from a program recording medium into a computer assembled into a dedicated hardware, or a generally used personal computer, for example, capable of executing various functions by installing various programs.

FIG. 10 is a block diagram showing an example of a configuration of a personal computer 201 in which the series of above-described processes are executed by a program. A CPU (Central Processing Unit) 211 executes various processes according to a program stored in a ROM (Read Only Memory) 212 or a storing unit 218. In an RAM (Random Access Memory) 213, the program executed by the CPU 211, data, or the like are appropriately stored. The CPU 211, the ROM 212, and the RAM 213 are interchangeably connected by a bus 214.

To the CPU 211, an input/output interface 215 is connected via the bus 214. To the input/output interface 215, an input unit 216 formed of a keyboard, a mouse, a microphone, etc., and an output unit 217 formed of a display, a speaker, etc., are connected. The CPU 211 executes various processes in response to a command inputted from the input unit 216. The CPU 211 outputs a process result to the output unit 217.

The storing unit 218 connected to the input/output interface 215 is formed of a hard disk, for example, and stores the program executed by the CPU 211 and various data. A communication unit 219 communicates with an external device via a network such as the Internet or a local area network.

A program may be obtained via the communication unit 219, and may be stored in the storing unit 218.

When a removable medium 221 such as a magnetic disk, an optical disk, a magnetoptical disk, or a semiconductor memory, etc., is attached, a drive 220 connected to the input/output interface 215 drives these components to obtain the program, the data, or the like, recorded therein. The obtained program or data are transferred to the storing unit 218, as required, and stored therein.

As shown in FIG. 10, a program recording medium for storing a program which is installed into a computer and is executable by the computer is configured with: the removable media 221, which is a package media, formed of a magnetic disk (including a flexible disk), an optical disk (including a CD-ROM (Compact Disc-Read Only Memory), a DVD (Digital Versatile Disk)), a magneto-optical disk, or a semi-conductor memory, etc.; the ROM 212 in which the program is temporarily or persistently stored; a hard disk configuring the storing unit 218; and other components. The storing of the program into the program recording medium is performed by utilizing a wired or wireless communication medium, such as a local area network, the Internet, a digital satellite broadcast, via, as required, the communication unit 219, which is an interface such as a router, modem, or the like.

It is noted that in the specification, a step for writing the program stored in the program recording medium includes not only a process performed chronologically according to the order described herein, but also a process executed in parallel or individually even though not always processed chronologically.

Further, in the specification, the system expresses a whole of an apparatus configured by a plurality of apparatuses.

According to the first aspect of the present invention, it may be possible to perform an optimal communication, without depending on communications media. In particular, it may be possible to stabilize a delay time which is emphasized in streaming, or the like.

According to the second aspect of the present invention, it may be possible to perform an optimal communication, without depending on communications media. In particular, it may be possible to provide a convenient streaming environment.

The embodiment of the present invention is not limited to the above-described embodiment, and it may be possible to make various modifications without departing from the spirit of the present invention.

It should be understood by those skilled in the art that various modifications, combinations, sub-combinations and alterations may occur depending on design requirements and other factors insofar as they are within the scope of the appended claims or the equivalents thereof.

CROSS REFERENCES TO RELATED APPLICATIONS

The present document contains subject matter related to Japanese Patent Application JP 2006-298605 filed in the Japanese Patent Office on Nov. 2, 2006, the entire contents of which being incorporated herein by reference.

What is claimed is:

1. A transmitting apparatus for transmitting data, comprising:
   data import means for importing data;
   packetizing means for packetizing the data imported by the data import means;
   a buffer for accumulating the data which are packetized;
   transmitting means for transmitting the data accumulated in the buffer;
   clearing means for clearing the buffer at each time that a predetermined time is lapsed;
   number-of-data counting means for counting the number of the data which are not transmitted within the predetermined time;
   time measuring means for measuring a transmission idle time which lasts from a transmission completion time of the data to a clearing time of the buffer by the clearing means, in a case where all of the data accumulated in the buffer are transmitted before the predetermined time is lapsed; and
   data import controlling means for controlling a data importing rate, based on the number of the data counted by the number-of-data counting means or the transmission idle time measured by the time measuring means.

2. The transmitting apparatus according to claim 1, wherein:
   the data import means compresses data to be transmitted, and
   the data import controlling means controls a compression rate of the data, based on the number of the data counted by the number-of-data counting means or the transmission idle time measured by the time measuring means.

3. The transmitting apparatus according to claim 2, wherein the packetizing means packetizes the data compressed by the data import means with each priority, and the transmitting means transmits the data accumulated in the buffer in order of the priority.

4. The transmitting apparatus according to claim 2, wherein the buffer includes a plurality of buffer areas.

5. The transmitting apparatus according to claim 2, further comprising speed controlling means for controlling a transmission speed of the data, depending on the transmission idle time measured by the time measuring means.

6. A transmitting method of a transmitting apparatus for transmitting data, comprising the following steps of:
   importing data to be transmitted;
   packetizing the data which are imported;
   accumulating into a buffer the data which are packetized;
   transmitting the data accumulated in the buffer;
   clearing the buffer at each time that a predetermined time is lapsed;
   counting the number of data which are not transmitted within the predetermined time;
   measuring a transmission idle time which lasts from a transmission completion time of the data to a clearing time of the buffer, in a case where all of the data accumulated in the buffer are transmitted before the predetermined time is lapsed; and
   controlling a importing rate of the data, depending on the number of the data which are counted or the transmission idle time which is measured.

7. A program stored on a non-transitory recording medium for allowing a computer to perform a process to transmit data, comprising the following steps of:
   importing data to be transmitted;
   packetizing the data which are imported;
   accumulating into a buffer the data which are packetized;

transmitting the data accumulated in the buffer;
clearing the buffer at each time that a predetermined time is lapsed;
counting the number of data which are not transmitted within the predetermined time;
measuring a transmission idle time which lasts from a transmission completion time of the data to a clearing time of the buffer, in a case where all of the data accumulated in the buffer are transmitted before the predetermined time is lapsed; and
controlling a importing rate of the data, depending on the number of the data which are counted or the transmission idle time which is measured.

8. A communications system configured with: a transmitting apparatus for transmitting data; and a receiving apparatus for receiving the data; wherein the transmitting apparatus comprises:
data import means for importing data;
packetizing means for packetizing the data imported by the data import means;
a buffer for accumulating the data which are packetized;
transmitting means for transmitting to the receiving apparatus the data accumulated in the buffer;
clearing means for clearing the buffer at each time that a predetermined time is lapsed;
number-of-data counting means for counting the number of the data which are not transmitted within the predetermined time;
time measuring means for measuring a transmission idle time which lasts from a transmission completion time of the data to a clearing time of the buffer by the clearing means, in a case where all of the data accumulated in the buffer are transmitted before the predetermined time is lapsed; and
data import controlling means for controlling a data importing rate, depending on the number of the data counted by the number-of-data counting means or the transmission idle time measured by the time measuring means.

9. The system according to claim 8, wherein:
the data import means compresses data to be transmitted, and
the data import controlling means controls a compression rate of the data, depending on the number of the data counted by the number-of-data counting means or the transmission idle time measured by the time measuring means.

* * * * *